J. GAYLEY.
APPARATUS FOR EXTRACTING MOISTURE FROM AIR FOR BLAST FURNACES AND CONVERTERS.
APPLICATION FILED SEPT. 14, 1903.

953,525.

Patented Mar. 29, 1910.
3 SHEETS—SHEET 1.

WITNESSES

INVENTOR

J. GAYLEY.
APPARATUS FOR EXTRACTING MOISTURE FROM AIR FOR BLAST FURNACES AND CONVERTERS.
APPLICATION FILED SEPT. 14, 1903.

953,525.

Patented Mar. 29, 1910.

3 SHEETS—SHEET 3.

WITNESSES

INVENTOR

UNITED STATES PATENT OFFICE.

JAMES GAYLEY, OF NEW YORK, N. Y.

APPARATUS FOR EXTRACTING MOISTURE FROM AIR FOR BLAST-FURNACES AND CONVERTERS.

953,525.  Specification of Letters Patent.  Patented Mar. 29, 1910.

Application filed September 14, 1903. Serial No. 173,107.

*To all whom it may concern:*

Be it known that I, JAMES GAYLEY, of New York city, in the county of New York and State of New York, have invented a new and useful Apparatus for Extracting Moisture from Air for Blast-Furnaces and Converters, of which the following is a full, clear, and exact description, reference being had to the accompanying drawings, forming part of this specification, in which—

Figure 1:
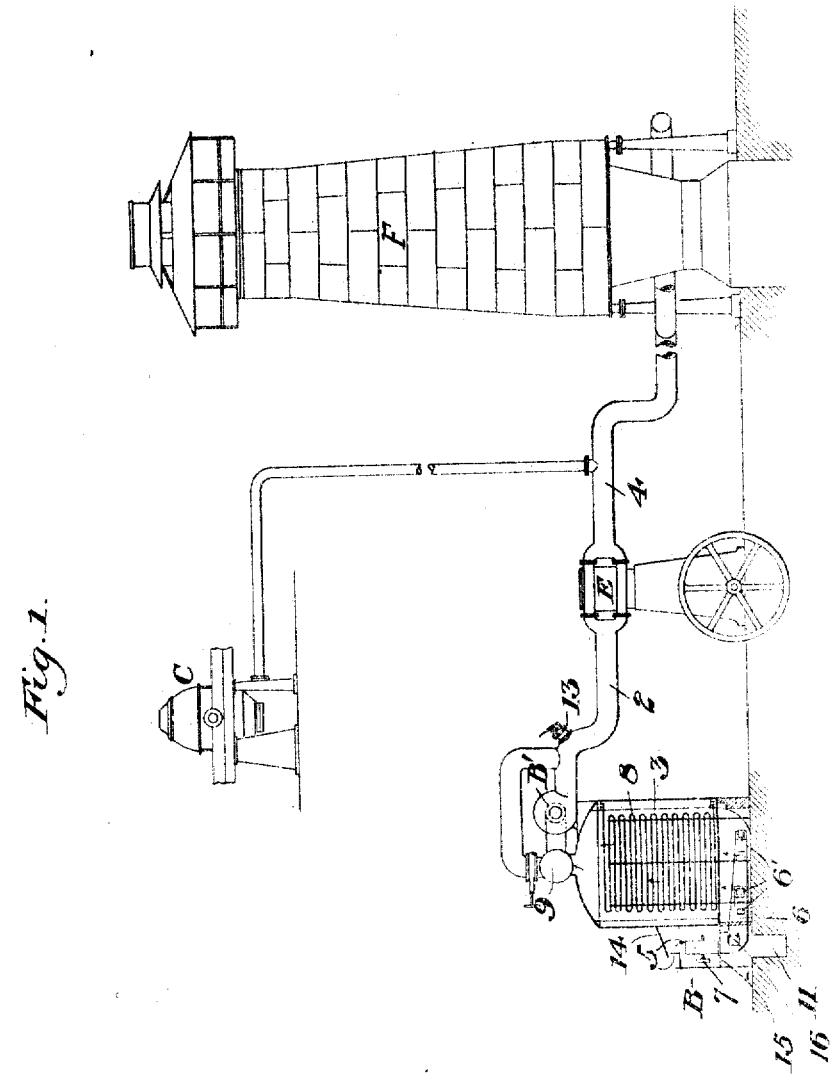
Figure 2:
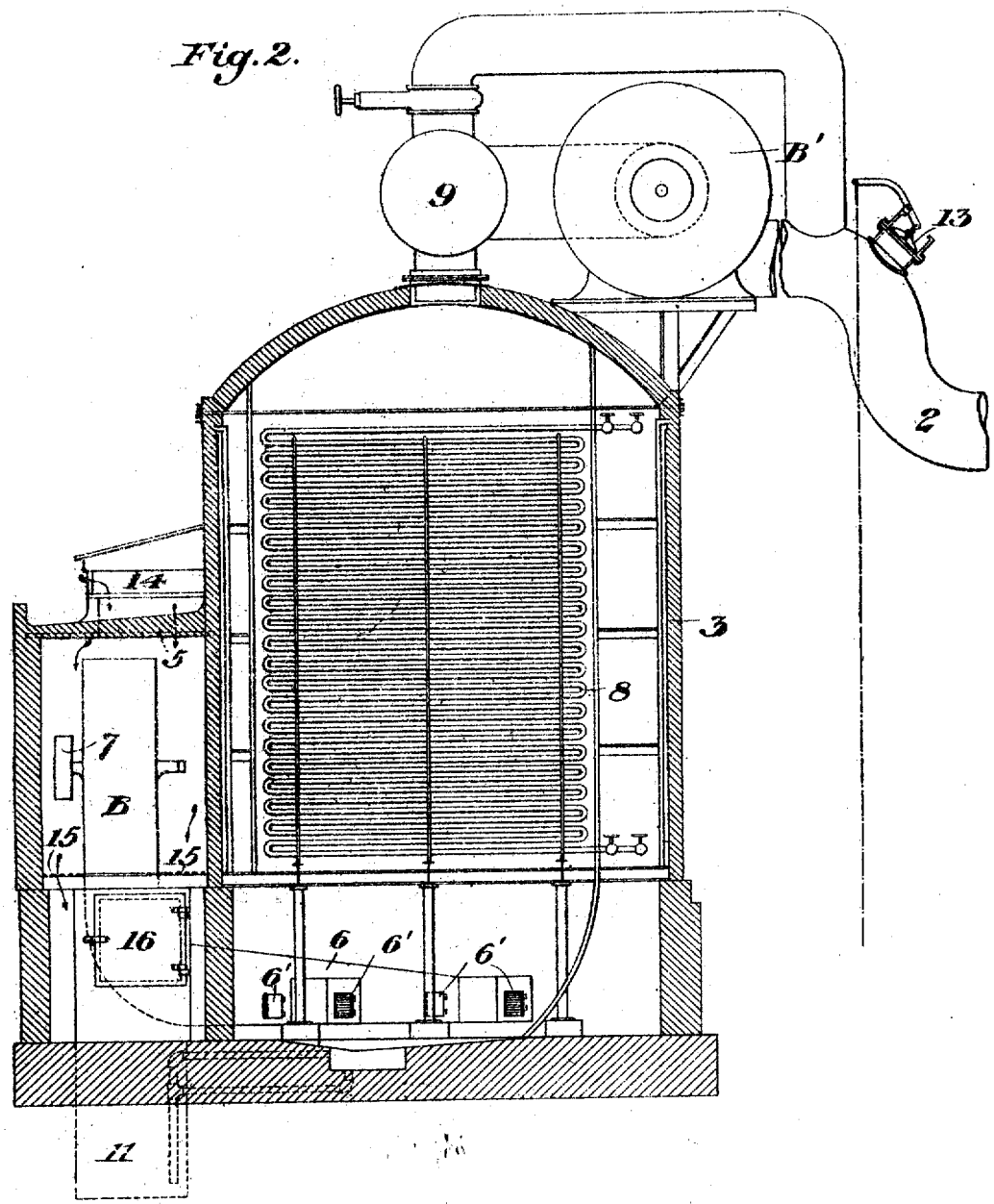
Figure 3:
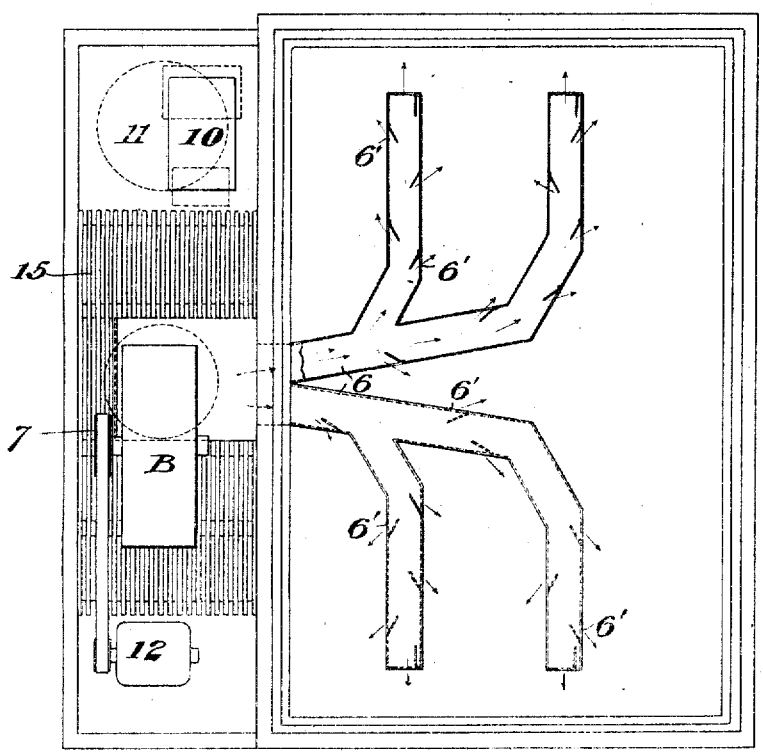

Figure 1 shows in elevation a blast furnace and converter arranged in accordance with my invention. Fig. 2 shows the air-refrigerating apparatus in elevation, partly in longitudinal section. Fig. 3 is a plan view of the bottom of the refrigerating chamber, showing the air-distributing pipe leading from the blower.

The successful conduct of all metallurgical operations depends to a great extent on the uniformity of the various materials used in the process. In operating blast furnaces and steel converters, one of the most disturbing influences is the varying amount of moisture in the atmosphere, since in both these processes a large amount of air is consumed for the purpose of oxidation or combustion. It requires approximately 7,500 pounds of raw materials, viz: fuel, ore and limestone, to produce a ton of pig iron, and about 12,000 pounds of air. It becomes therefore of great importance that the air should be rendered uniform in respect to its content of moisture which is the variable element influencing cost of operations in iron and steel manufacturing. Raw material has gained in uniformity, and is now as uniform as human skill can make it. In the practice of to-day, variation in composition of raw material is within ten per cent., and the temperature and volume of air can be controlled within a like per cent., but the humidity of the atmosphere varying from 20 to 200 per cent. has hitherto been beyond control. Its presence in metallurgical operations is injurious, not only because it is decomposed in the parts of the apparatus where high heat is required, and thus absorbs heat, but the fluctuations in the quantity of moisture carried by the air produce corresponding irregularities in the conduct of the process and in the quality of the product. Thus, in the State of Pennsylvania, from the months of April to September, inclusive, the air contains at least fifty per cent. more moisture than the average for the other months of the year, and often for short periods of time the ratio of difference is much greater. When it is considered that when a blast furnace uses per minute one thousand cubic feet of air containing one grain of moisture per cubic foot, one gallon of water enters every hour; and that the smaller blast furnaces use per minute eight thousand cubic feet of air, and the larger ones thirty to fifty thousand cubic feet, each cubic foot containing from two to eight grains of moisture, it becomes apparent that unless the variations in the moisture are corrected uniform conduct of the process is rendered practically unattainable. In consuming thirty thousand cubic feet of air per minute, containing two grains of moisture per cubic foot, sixty gallons of water per hour are delivered to the furnace, and when the air contains eight grains of moisture per cubic foot, two hundred and forty gallons are delivered per hour. As the decomposition of this large quantity of aqueous vapor is accomplished at the expense of heat, the varying conditions caused by the atmosphere alone will be readily appreciated. Thus, in the summer months, because of the greater content of moisture in the air, two hundred more pounds of fuel on an average are required to produce a ton of pig iron than in the winter months. These facts make it very difficult for the blast-furnace manager to secure uniformity of product. Variations in the content of moisture in the atmosphere produce irregularity in the operation of the furnace, and affect the quantity of fuel necessary to be used, and these varying conditions in turn make irregular the chemical composition of the pig metal with reference to the non-metallic constituents, carbon, silicon, &c. The value of the product is thus often impaired, and the uncertainty of the result which will be attained in any given tapping of the furnace is a matter of serious inconvenience.

In the operation of the Bessemer converter like difficulties arise from the moisture of the atmosphere and its variations. Its presence in large quantity causes a cooling of the metal bath which interferes with the uniform conduct of the process and often produces wasteful chilled heats. In order to obviate these bad effects, it is necessary to charge into the converter a pig iron containing a sufficiently large content of silicon to raise the temperature of the blow and thus neutralize the chilling effect of the moisture. Additional fuel in the blast furnace is required to produce such high silicon metal, and at all times a surplus of heat must be carried to maintain, even to a limited extent, the equilibrium of the furnace. All these sources of irregularity and expense in metallurgical operations are eliminated by use of my invention, by means of which I furnish for the furnace or converter an air-blast practically free from atmospheric moisture, and that which remains can be maintained at a practically uniform percentage.

In order to fully understand the application of this device, I would explain that it is intended to be used with blast furnaces for the smelting of ores and with steel converters for the conversion of iron into steel. In all of these the air is used solely for the purpose of oxidation or combustion. Blast furnaces are now constructed with a height of one hundred feet and a diameter of twenty-three feet. These are kept full continuously with a mixture of fuel, ore and flux, which offers great resistance to the penetration of the blast and not uncommonly requires an air-blast having a pressure of fifteen to twenty pounds per square inch. Likewise in the converter the air is forced through a bath of metal which frequently weighs fifteen tons, and requires a blast pressure of twenty-five pounds per square inch to penetrate it. The condensation of moisture from air in rapid motion and consumed in large volumes, presents difficulties not found in any other processes, and any attempt to remove the moisture from the furnace-blast by the use of chemical agents having affinity for water must necessarily prove impracticable.

In the practice of my invention I remove the moisture from the air and render it dry, or so dry at least that the percentage of moisture contained in the air is small and practically uniform, by subjecting it to artificial refrigeration, whereby the moisture is condensed as water or snow and may be collected and withdrawn, the air being fed to the furnace or converter under compression, and being maintained constantly under compression from the time it leaves the blowing-engine until it reaches the furnace.

My apparatus which forms the subject of this specification possesses many advantageous qualities for treating air traveling with a high velocity.

Referring now to the drawings, 2 is the pipe through which the air passes from the refrigerator or drying chamber 3 to the blowing-engine E, and 4 is the pipe conducting the air under compression from the blowing-engine to the furnace or converter.

C represents a converter for the manufacture of steel, and F represents a blast-furnace, into the twyers of which the dried air is delivered from the pipe 4. Air may be drawn by a blower or fan B through the inlet 5 and fed into the refrigerating chamber through the distributing conduits 6, or the blower B may be dispensed with, and a blower B′ used instead to aspirate the air through the refrigerating chamber. B and B′ show two locations for the fan, as it may be preferred either to feed or aspirate the air through the refrigerating chamber, but it is not necessary to use both. When the fan B is used, the air enters the pipe 5 and is forced by the fan which is power-driven through the driving wheel 7 driven by a motor 12, and preferably into the distributing pipes 6 which lead into the refrigerating chamber 3, and open at various points therein with valve-controlled openings 6′, so that the air shall be evenly distributed under the refrigerating pipes 8, and will come into contact with these pipes which are cooled to a low temperature by anhydrous ammonia or other refrigerant. The cooling agent is preferably anhydrous ammonia, furnished by an ice-making machine of suitable design. On evaporation, it produces a very low temperature, though other refrigerants producing intense cold, such as carbonic anhydrid, may be employed. The moisture in the air is deposited on these pipes preferably in the form of snow, and the dried air passes into a receiving chamber 9, and thence through the pipe 2 to the blowing-engine E, from where it is delivered to the furnace or converter. If the blower or fan B′ is used, the fan B is dispensed with and the air is aspirated from the inlet-pipe 5 to the blower B′ and then fed into the blowing-engine E. If for any reason the blower B should become inoperative, the air would pass through the hood or air-inlet 14 and opening 5 of the fan-room and through the open floor 15 of the fan-room into the cellar and into the fan-discharge pipe 6, through a door 16, which must be opened as soon as the fan is not in operation. A by-pass is thus provided for the air. If the blower B′ is used, a special by-pass must be provided to admit air to the engine when the fan becomes inoperative.

In Fig. 3, 10 is a pump for withdrawing the condensed water or melted snow from the collecting pit 11. On the pipe 2 is a valve 13 which is used when the engine E is not in operation. When this valve is opened a small current of air from the blower flows through the refrigerating chamber out of the valve-opening, thus maintaining the refrigerator appliances in normal working condition, and, by the refrigerant absorbing heat, preventing the frosting of the refrigerant pipes. The blower B or B' is auxiliary to the blowing-engine E. It is valuable because it relieves the blowing-engine of a large amount of work due to the back-pressure or exhausting of air through the conduits and lines of refrigerating coil which obstruct its free passage and would cause the engine to draw in less air than if the inlet-valves were freely exposed to the atmosphere. The pressure developed by the blower need be very small, one ounce or less, and even if only sufficient pressure is developed thereby in the refrigerating chamber to give the normal atmospheric pressure at the engine inlet-valves, the advantage of the auxiliary blower would still be practically attained.

The air that is propelled by the blower B or B' passes into the distributing pipe 6, then upward and around the coils of pipe 8 which are very cold due to the refrigerating fluid, and on these pipes the moisture is preferably condensed in the form of frost; it then passes into the receiver 9, then through conduit 2 to the blowing-engine, from which it is fed under pressure to the furnace or converter either directly or through a stove, and maintained under pressure from the time it leaves the engine until it enters the furnace or converter. When the pipes in the refrigerating chamber become covered with frost, the frost is thawed off by passing the hot ammonia gas through one of the coils or series of coils, and the water melted therefrom will collect in the pit 11 and can be withdrawn. Meanwhile the other series of the coils can be used with refrigerant in the usual way, and by thus thawing the series successively, instead of thawing all of them at once, the operation of the apparatus is not interrupted and can be made continuous in a single chamber.

It will be observed that, on account of the air being constantly in rapid motion and under pressure, and the enormous volume required, the methods usually employed for extracting a portion of the moisture from small volumes of air in applying it to drying grain, cooling rooms, &c., are not applicable to blast-furnaces and converters, since in many of these methods the air is allowed to expand, which in itself is the most serviceable refrigerating process and simplifies the operation to a great extent, while in my process there is no substantial expansion of the air prior to its introduction into the furnace.

Various arrangements of these appliances will be suggested to those skilled in the art, without affecting my invention which consists principally in the introduction of a blower auxiliary to the main blowing engine and maintaining in a single chamber a continuous refrigerating operation.

My apparatus can be applied to drying the air for use in open-hearth furnaces, and for other purposes in the arts wherein dry air is an important factor.

The advantages of my invention will be appreciated by those skilled in the art. By rendering the air dry or practically dry by refrigeration as described above before it is introduced into the furnace or converter and supplying such dry air in large quantities under constant compression, the amount of moisture is made practically uniform from day to day and from year to year. It is thus made easy for the blast-furnace manager to secure uniformity in the character of metal produced by the furnace, notwithstanding varying meteorological conditions, and without that close supervision which is necessary in furnace-practice heretofore in common use.

By the words "blowing engine" in my claims I mean an air-pumping apparatus which at the same time measures the air supplied to it.

I claim:—

1. Apparatus for producing dry air, comprising a refrigerating chamber having an air inlet and an air outlet, a blower connected with the air inlet and arranged to discharge air into the refrigerating chamber, a service pipe leading from the outlet, and a blowing engine connected to the service pipe and arranged to draw from the refrigerating chamber the air discharged into it by the blower; substantially as described.

2. Apparatus for extracting moisture from air which consists in the combination of a refrigerating chamber, a blowing engine connected with the refrigerating chamber, a blower to feed the air to the blowing engine, said blowing engine and blower being arranged to cause the flow of air through the refrigerating chamber, and a by-pass for the blower; substantially as described.

3. Apparatus for extracting moisture from air, comprising a refrigerating chamber having an air inlet and an air outlet, a service pipe connected to the outlet, a blowing engine connected with the service pipe, said pipe having a valved outlet between the engine and chamber, and a blower arranged to feed air through the inlet into the refrigerating chamber; substantially as described.

4. Apparatus for producing dry air, comprising a refrigerating chamber having a refrigerating element, an air space inclosing said element and provided with an inlet and an outlet, a service pipe connected with the outlet, a blowing engine included in the service pipe, a blower included in the service pipe between the refrigerating chamber and the engine, and a by-pass included in the service pipe for cutting off the blower.

In testimony whereof, I have hereunto set my hand.

JAMES GAYLEY

Witnesses:
Thomas W. Bakewell,
H. M. Corwin.